March 5, 1968 E. I. SCHWARTZ 3,372,236

ISOLATING SWITCH ARRANGEMENT FOR TELEPHONES

Filed Jan. 18, 1965

INVENTOR:
EDMUND I. SCHWARTZ

BY Breitenfeld & Levine
ATTORNEYS

United States Patent Office 3,372,236

Patented Mar. 5, 1968

3,372,236

ISOLATING SWITCH ARRANGEMENT FOR TELEPHONES

Edmund I. Schwartz, Fairlawn, N.J., assignor to Devenco Incorporated, New York, N.Y., a corporation of New York Filed Jan. 18, 1965, Ser. No. 426,261
8 Claims. (Cl. 179—1)

ABSTRACT OF THE DISCLOSURE

Relay has switches interposed between mainline cable and telephone instrument. Relay coil is energized to close switches when handset is lifted, and deenergized when handset is replaced. Relay embedded in mass of hardened plastic. Indicator lamp energized through switch of second relay when switches of first relay are open, and deenergized when first relay switches close.

Figure 1:
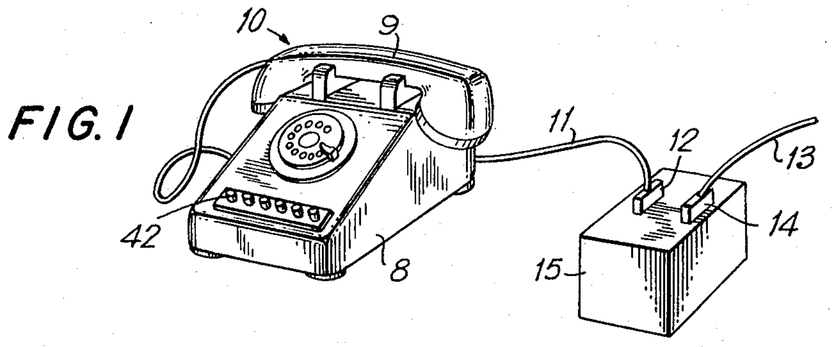

This invention relates to an isolating switch arrangement, and more particularly to such an arrangement for use with a telephone installation.

A telephone installation of the type referred to includes a mainline cable leading to the main circuits of the installation, and a telephone instrument connected to the mainline cable. The telephone instrument comprises, as usual, a body portion formed with a cradle, and a handset which is normally seated on the cradle and is lifted when the instrument is to be used. In common practice, the mainline cable terminates in a connector, and the telephone instrument includes a length of cable extending from it and terminating in a connector separably cooperable with the main cable connector. The main cable connector is sometimes referred to as a "jack," and the telephone set connector is a male plug adapted to be accommodated by the jack.

Under certain circumstances, it is desirable that the telephone instrument be disconnected from the mainline telephone cable when the instrument is not in use. This could be accomplished by separating the telephone instrument and mainline cable connectors, and then rejoining them when it is desired to use the telephone. If the telephone is used at relatively frequent intervals, the above procedure becomes inconvenient and time-consuming. Furthermore, with the telephone disconnected, the bell in the instrument will not ring to advise the user of an incoming call.

It is a general object of the present invention to provide an arrangement for isolating a telephone instrument from the mainline telephone cable when the telephone is not in use, and for automatically connecting the instrument to the mainline cable when it is desired to use the telephone.

It is another object of the invention to provide such an arrangement which may be readily added to an existing telephone installation without the use of tools or need for special skill.

It is a further object of the invention to provide such an arrangement wherein connection and disconnection of the telephone instrument and mailine cable are controlled by lifting the handset from, and reseating it on, its cradle.

It is still another object of the invention to provide such an arrangement including switch means between the telephone instrument and the mainline cable, and to inaccessibly locate the switch means in such a way that it will be apparent if the arrangement is tampered with in order to gain access to the switch means.

It is still a further object of the invention to provide a signal device independent of the switch means and arranged to be actuated to announce an incoming call.

It is yet another object of the invention to provide an indicator lamp which remains lit when the switch means serves to disconnect the telephone instrument and mainline cable and which is deenergized when the instrument and cable are connected.

It is yet a further object of the invention to provide such an apparatus with a self-contained source of power for operating the switch means so that the apparatus will function and permit use of the telephone even in the absence of an outside source of power.

To accomplish these objectives, the present invention provides, in its preferred embodiment, a relay having a plurality of switches, one side of the switches leading to a connector cooperable with the mainline cable connector and the other side leading to a connector cooperable with the telephone instrument connector. Thus, the relay switches may readily be interposed between the instrument and the mainline cable. A source of power is connected to the relay coil via a switch carried by the telephone instrument which shifts between an open and closed position upon removal of the handset from, and replacement of the handset on, the cradle of the instrument. Thus, by merely lifting the handset, the relay is actuated to close its switches, and connect the instrument to the mainline cable, and by reseating the handset on its cradlde, the relay is caused to open its switches. The relay is embedded in a mass of hardened plastic material so that it is inaccessible without damaging the plastic material. In addition a signal device is electrically connected between the relay switches and the connector cooperable with the mainline cable connector so that it will be energized to announce an incoming call regardless of the condition of the relay switches. Furthermore, an indicator lamp is connected to the power source through the switch of a relay whose coil is connected in parallel with the coil of the relay mentioned above. The two relays are of opposite types so that the indicator relay switch is closed and the lamp lit when the switches between the telephone instrument and mainline cable are open, and vice versa. Thus, at any time the indicator lamp is not lit, the user of the telephone will be aware that the telephone may be connected to the mainline cable.

Other objects and advantages of the invention will be apparent from the following detailed description in which reference is made to the accompanying drawings.

Figure 2:
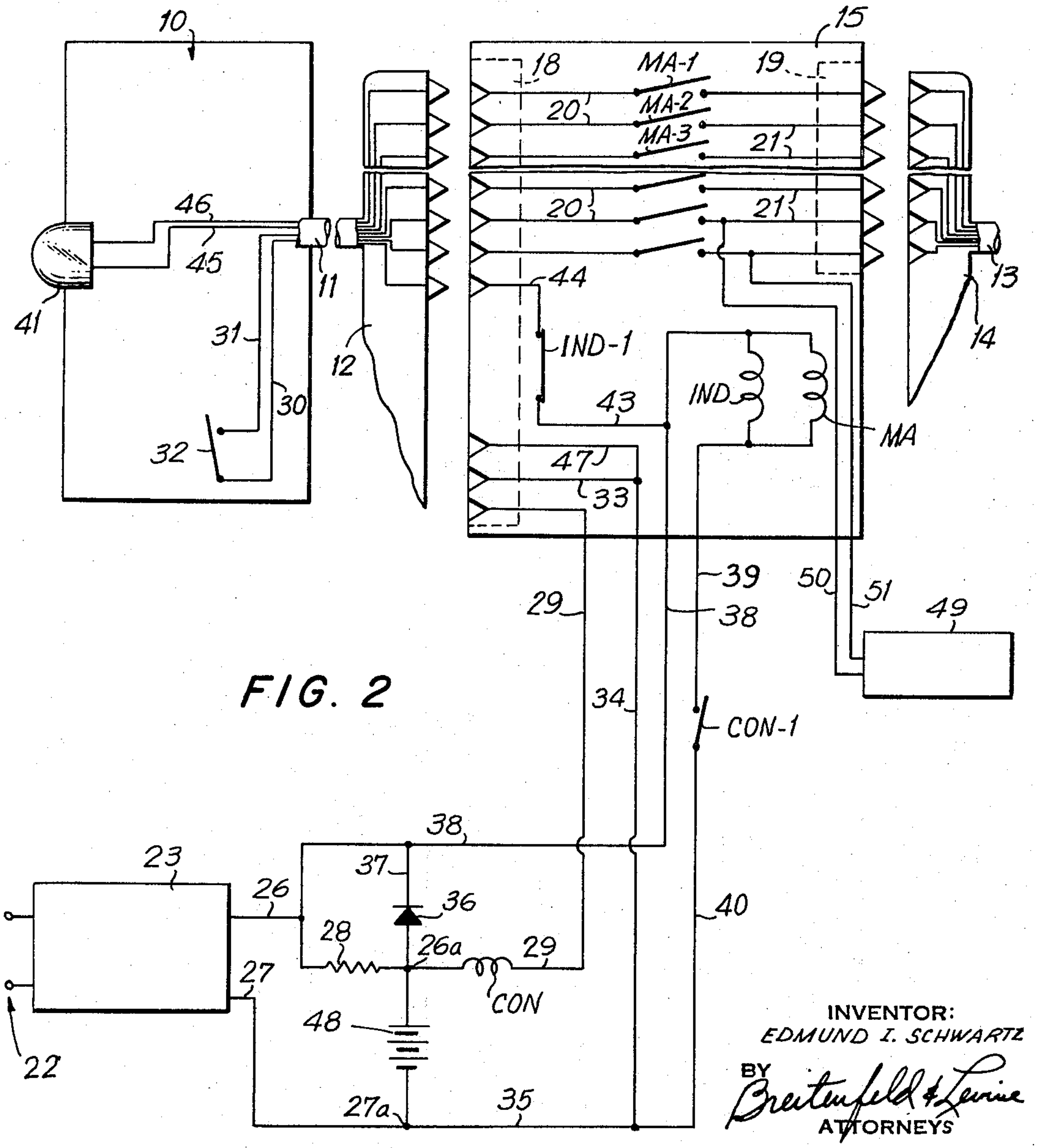

In the drawings:

FIG. 1 is a perspective view of a telephone installation according to this invention, and FIG. 2 is a schematic wiring diagram of the illustrative apparatus of FIG. 1.

A telephone instrument 10 of conventional design, includes a handset 9 and a body portion 8 having a cradle on which the handset may be seated. Extending from the instrument 10 is a cable 11, including a plurality of individual conductors, terminating in a conventional connector 12. A mainline cable 13, including a plurality of individual conductors leading to the main circuits of the telephone installation, terminates in a connector 14 cooperable with the connector 12. Each connector, of course, includes a plurality of mutually-insulated terminals, each terminal being attached to one of the conductors in its respective cable. Thus, in a conventional telephone installation, interengagement of the connectors 12 and 14 results in each conductor of the mainline cable 13 being connected to one of the conductors of the instrument cable 11.

According to the present invention, the connectors 12 and 14 are not directly interconnected. Instead, they are connected via a device of special character interposed between them. The device includes a block 15 of a suitable hardened molded plastic, such as an epoxy resin. Completely embedded within the block is a main relay including a coil MA and a plurality of normally-open switches MA–1, MA–2, etc. Any well-known type of hermetically sealed relay, which will not be effected by contact with molten plastic material during formation of the block 15, may be employed. In general, a main relay switch is provided for each conductor in the mainline cable 13 which is to be connected to a conductor in the instrument cable 11. In certain telephone installations, where all the cable conductors are not used, fewer switches may be provided corresponding to the number of conductors actually in use. Furthermore, under certain circumstances, more than a single pair of conductors may be bridged by some of the main relay switches. Where a large number of switches are employed, it may be desirable to provide more than a single relay coil MA, each coil controlling only a portion of the total number of switches present. In such a case, the coils are connected in parallel so that they may be simultaneously energized and deenergized conveniently.

Partially embedded in the block 15 are two connectors 18 and 19, each having a plurality of mutually insulated terminals. One side of each of the main relay switches is connected to one of the terminals of the connector 18 by means of a conductor 20, and the other side of each switch is connected to one of the terminals of the connector 19 by means of a conductor 21. Only the front or operative face of each of the connectors 18 and 19 are exposed, the remainder of each connector, including the region at which connections to the conductors 20 and 21 are made, being permanently embedded within the block 15. The connector 18 is cooperable with the instrument connector 12 and the connector 19 is cooperable with the connector 14. It will be seen therefore that when the connectors 12 and 18, and 14 and 19, are interengaged, each main relay switch is interposed between a conductor in the mainline cable 13 and a conductor in the instrument cable 11.

The power for energizing the relay coil MA, and other components of the invention to be described below, may be taken from any convenient source 22 locally available. Usually A.C. power is available, and therefore a unit 23 of conventional design comprising essentially a transformer and a rectifier is furnished to provide D.C. power at the terminals 26 and 27. The relay coil MA is to be energized only when it is desired to use the telephone, and deenergized at all other times. Therefore, according to this invention, energization and deenergization of the coil MA is determined by a switch 32 associated with the telephone instrument 10. The switch 32 remains open when the handset 9 is seated on the cradle of the body portion 8 of the telephone instrument, and the switch closes when the handset is lifted off the cradle. The switch 32 may be added to the instrument, or it may be one of the switches usually present within the telephone instrument. If a switch within the instrument is employed, one must be chosen which does not interfere with the normal operation of the telephone. The switch 32 operates a control circuit which in turn controls the operation of the main relay circuit.

The control circuit extends from terminal 26 of the D.C. power unit 23, through current-limiting resistor 28, coil CON of a control relay, conductor 29, two engaged terminals of connectors 18 and 12, respectively, conductor 30 in cable 11, switch 32, conductor 31 in cable 11, two other engaged terminals of connectors 12 and 18, respectively, and conductors 33, 34, and 35, returning to terminal 27. Obviously, when switch 32 closes, the relay coil CON becomes energized. The diode 36 insures that the coil CON receives current only through resistor 28, and not directly from terminal 26 through conductor 37. The main relay circuit extends from terminal 26 through conductor 38, coil MA of the main relay, conductor 39, normally-open switch CON–1 of the control relay, and conductors 40 and 35, returning to terminal 27. It will be seen that when switch CON–1 closes a circuit is completed for energizing coil MA. It is believed that operation of the present arrangement, as thus far described, will be apparent. When the handset 9 is seated on the cradle of the telephone instrument, the switch 32 is open and control relay coil CON is deenergized. Switch CON–1 is, therefore, open and main relay coil MA is deenergized. Switches MA–1, MA–2, etc. are, therefore, open and the telephone instrument 10 is completely disconnected from the mainline cable 13. When the handset 9 is lifted off the cradle, the switch 32 closes completing the control circuit and resulting in the energization of control relay coil CON. In response, the control relay switch CON–1 closes completing the circuit for energizing the main relay coil MA. Thereupon, the main relay switches MA–1, MA–2, etc. close and connect the telephone instrument 10 to the mainline cable 13.

The present invention provides an indicator lamp for advising the user of the telephone that the main relay switches are open or that they may be closed. The indicator lamp may be independent of the telephone instrument, or it may be the lamp 41 normally present beneath the "hold" button 42 (FIG. 1) of a telephone instrument. Energization of the lamp 41 is controlled by an indicator relay, embedded in the plastic block 15, including a coil IND connected in parallel with the coil MA across conductors 38 and 39. Thus, coils IND and MA are energized simultaneously and deenergized simultaneously. The circuit for energizing the indicator lamp 41 extends from terminal 26 of the D.C. power supply 23, through conductors 38 and 43, normally-closed switch IND–1 of the indicator relay, conductor 44, two engaged terminals of connectors 18 and 12, respectively, conductor 45, lamp 41, conductor 46, two other engaged terminals of connectors 12 and 18, respectively, and conductors 47, 34, and 35, returning to terminal 27. When the handset 9 is seated on its cradle, coils IND and MA are deenergized, as explained above, and since switch IND–1 is closed lamp 41 is lit. When lamp 41 is lit, therefore, anyone viewing it can be sure that the telephone instrument 10 is disconnected from the mainline cable, since the lamp is lit only when coil IND is deenergized, and if coil IND is deenergized, coil MA must be deenergized and hence switches MA–1, MA–2, etc. are open. When the handset 9 is lifted, the lamp 41 of course goes out. The indicator lamp arrangement just described is "fail-safe," i.e., should the power supply fail, the lamp 41 will be deenergized, thus warning the telephone user that the main relay switches may be closed, although in fact in the case of a power failure these switches will remain open.

In the event of a power failure, the present device will continue to operate for a limited time on power supplied by a battery 48 connected between conductors 29 and 35. The battery will provide power to the circuits in the same way as described above in connection with the power supply unit 23. Terminals 26*a* and 27*a* of a battery 48 correspond to terminals 26 and 27 of the power supply 23, current being supplied to conductor 38 through diode 36 and conductor 37. Under normal conditions, the battery is constantly provided with a trickle charge from the power supply 23 via resistor 28.

It will be apparent that when the main relay switches MA–1, MA–2, etc. are open, as they are when the telephone instrument is not in use, the bell in the instrument which usually rings to announce an incoming call will not be energized. Therefore, the present invention provides a signal device 49, such as a bell, connected, by means of conductors 50 and 51 to two of the conductors 21. The two conductors 21 are those which are electrically connected, by means of cooperative engagement of connectors 19 and 14, to the two conductors in the mainline cable which carry current when an incoming call is to be announced. Thus, the signal device 49 will be energized to announce an incoming call despite the fact that the telephone instrument is completely disconnected from the mainline cable. If there is an inter-office communication arrangement associated with the telephone, the signal for this arrangement can be provided in a way similar to that just described with respect to the incoming call signal.

From the above description it will be appreciated that the main relay, which connects the telephone instrument 10 to, and disconnects it from, the mainline cable 13, is totally inaccessible inasmuch as it is permanently and completely embedded within the hardened block of plastic 15. The same is true of the indicator relay which controls the energization of the lamp 41. Consequently, it is impossible to tamper with either of these relays without destroying or damaging the block 15. Thus, any tampering will immediately be obvious upon even a casual glance at the present device. Furthermore, should the device be tampered with to the extent of closing the control relay switch CON–1, which in the illustrative embodiment is shown outside the block 15, the lamp 41 will be extinguished warning the user of the telephone that the switches MA–1, MA–2, etc. are closed. The control relay comprising the coil CON and switch CON–1 could, if desired, be embedded within the block 15.

The invention has been shown and described in preferred form only and by way of example, and many changes may be made in the embodiment disclosed without necessarily departing from the spirit and scope of the invention. It is understood, therefore, that the invention is not limited to any specific form or embodiment except insofar as such limitations appear in the appended claims.

What is claimed is:

1. In combination with a telephone installation including a telephone instrument with handset and cradle, a cable extending from the instrument and terminating in a connector, and a mainline cable terminating in a connector cooperable with the instrument connector:

(a) a device interposed between said connectors and comprising a switch means so embedded in a mass of hardened plastic material that it is inaccessible without damaging said plastic material, a first connector leading from one side of the switch means and cooperable with the instrument connector, and a second connector leading from the other side of the switch means and cooperable with the mainline connector, and (b) means associated with the telephone instrument for actuating said switch means to close it whenever the handset is lifted from its cradle and to open it whenever the handset is on its cradle.

2. The combination defined in claim 1 wherein said first and second connectors are also embedded in said plastic material with their operative faces exposed.

3. The combination defined in claim 1 including a signal device electrically connected between said switch means and said second connector so that said signal device is in constant electrical communication with the mainline cable and will be energized by means of said mainline cable even though said switch means is open.

4. In combination with a source of electric power, and with a telephone installation having a telephone instrument with handset and cradle, a cable extending from the instrument and terminating in a connector, and a mainline cable terminating in a connector cooperable with the instrument connector:

(a) a device comprising a relay having a coil and switch means, a first connector leading from one side of said switch means and cooperable with the instrument connector, and a second connector leading from the other side of said switch means and cooperable with the mainline connector, said switch means being interposed between said mainline cable and said instrument when said first and second connectors are in cooperative relationship with their respective cooperable connectors, (b) means associated with the telephone instrument for actuating said relay to close said switch means whenever the handset is lifted from its cradle and to open said switch means whenever the handset is on its cradle, and (c) an indicator lamp, and an indicator relay having a normally-closed switch, said lamp being connected to said power source through said switch, and said relay being deenergized when the handset of the telephone instrument is seated on its cradle whereby said lamp is energized when the handset is seated.

5. The combination defined in claim 4 wherein the coils of said relay means and indicator relay are connected in parallel across said power source whereby said relay-actuating means also actuates said indicator relay, to open said normally-closed switch and extinguish said lamp, when the handset of the telephone instrument is lifted.

6. The combination defined in claim 4 wherein said indicator lamp is beneath the "hold" button of the telephone instrument.

7. An arrangement as defined in claim 4 wherein said relay means and indicator relay are so embedded in a mass of hardened plastic material that they are inaccessible without damaging said plastic material.

8. A device for use with a telephone instrument provided with a switch which shifts between an open and closed position when the handset of the instrument is lifted from its cradle, comprising a solid block of hardened plastic material, relay means inaccessibly embedded within said block, said relay means having switch means, connector means partially embedded within said block for connecting a telephone instrument to a mainline cable via the switch means of said relay, and a source of power connectable to said relay means via the telephone instrument switch whereby said relay means is actuated to cause said switch means to connect the telephone instrument to the mainline cable when the handset of the instrument is lifted.

References Cited

UNITED STATES PATENTS

| | | | |
|---|---|---|---|
| 1,941,085 | 12/1933 | Hague et al. | 179—18.3 |
| 2,277,623 | 3/1942 | Allen | 179—81 |
| 2,619,550 | 11/1952 | Humphries | 179—81 |

WILLIAM C. COOPER, *Primary Examiner.*

KATHLEEN H. CLAFFY, *Examiner.*

H. ZELLER, *Assistant Examiner.*